United States Patent
Berger et al.

(10) Patent No.: US 8,639,887 B2
(45) Date of Patent: Jan. 28, 2014

(54) DYNAMICALLY ALTERING A PIPELINE CONTROLLER MODE BASED ON RESOURCE AVAILABILITY

(75) Inventors: Deanna Postles Dunn Berger, Poughkeepsie, NY (US); Michael Fee, Cold Spring, NY (US); Kenneth D. Klapproth, Austin, TX (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/821,766

(22) Filed: Jun. 23, 2010

(65) Prior Publication Data
US 2011/0320735 A1    Dec. 29, 2011

(51) Int. Cl.
*G06F 12/00* (2006.01)
*G06F 13/00* (2006.01)
*G06F 13/28* (2006.01)

(52) U.S. Cl.
USPC .................................. 711/140; 711/E12.026

(58) Field of Classification Search
USPC .......................... 711/140, E12.026
See application file for complete search history.

(56) References Cited

U.S. PATENT DOCUMENTS

| | | | |
|---|---|---|---|
| 5,555,392 A * | 9/1996 | Chaput et al. | 711/118 |
| 5,781,753 A | 7/1998 | McFarland et al. | |
| 6,401,192 B1 * | 6/2002 | Schroter et al. | 712/207 |
| 6,487,640 B1 | 11/2002 | Lipasti | |
| 6,567,901 B1 | 5/2003 | Neufeld | |
| 7,559,062 B2 | 7/2009 | Code et al. | |
| 7,707,359 B2 | 4/2010 | Mesard et al. | |
| 8,209,493 B2 * | 6/2012 | Rotithor | 711/147 |
| 2002/0083299 A1 * | 6/2002 | Van Huben et al. | 712/29 |
| 2002/0116584 A1 * | 8/2002 | Wilkerson | 711/133 |
| 2004/0117441 A1 * | 6/2004 | Liu et al. | 709/203 |
| 2004/0215773 A1 * | 10/2004 | Strait et al. | 709/225 |
| 2005/0125079 A1 | 6/2005 | Schreder et al. | |
| 2005/0172082 A1 * | 8/2005 | Liu et al. | 711/144 |
| 2007/0136534 A1 * | 6/2007 | Mesard et al. | 711/137 |
| 2008/0086733 A1 * | 4/2008 | Jensen et al. | 718/102 |
| 2009/0216917 A1 | 8/2009 | Shasha et al. | |
| 2009/0307035 A1 | 12/2009 | Steinglass et al. | |
| 2010/0274962 A1 * | 10/2010 | Mosek et al. | 711/113 |
| 2011/0320725 A1 * | 12/2011 | Dunn Berger et al. | 711/127 |

FOREIGN PATENT DOCUMENTS

EP    1241580 B1    9/2002

* cited by examiner

*Primary Examiner* — Sheng-Jen Tsai
(74) *Attorney, Agent, or Firm* — Cantor Colburn LLP; John Campbell

(57) ABSTRACT

A mechanism for dynamically altering a request received at a hardware component is provided. The request is received at the hardware component, and the request includes a mode option. It is determined whether an action of the request requires an unavailable resource and it is determined whether the mode option is for the action requiring the unavailable resource. In response to the mode option being for the action requiring the unavailable resource, the action is automatically removed from the request. The request is passed for pipeline arbitration without the action requiring the unavailable resource.

22 Claims, 5 Drawing Sheets

DYNAMICALLY ALTERING A PIPELINE CONTROLLER MODE BASED ON RESOURCE AVAILABILITY

BACKGROUND

Exemplary embodiments relate generally to pipelining, and more particularly, to dynamically altering a pipeline request mode.

In computing, a pipeline may be considered as a set of data processing elements connected in series, so that the output of one element is the input of the next one. The elements of a pipeline are often executed in parallel or in time-sliced fashion; in that case, some amount of buffer storage is often inserted between elements.

Further, an instruction pipeline is a technique used in the design of computers and other digital electronic devices to increase their instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

Most modern central processing units (CPUs) are driven by a clock. The CPU consists internally of logic and memory (e.g., flip flops). When the clock signal arrives, the flip flops take their new value and the logic then requires a period of time to decode the new values. Then the next clock pulse (clock cycle) arrives and the flip flops again take their new values, and so on. By breaking the logic into smaller pieces and inserting flip flops between the pieces of logic, the delay before the logic gives valid outputs is reduced. In this way the clock period can be reduced. For example, the classic reduced instruction set computer (RISC) pipeline is broken into five stages with a set of flip flops between each stage: instruction fetch, instruction decode and register fetch, execute, memory access, and register write back.

BRIEF SUMMARY

An exemplary embodiment includes a method for dynamically altering a request received at a hardware component. The request is received at the hardware component, and the request includes a mode option. It is determined whether an action of the request requires an unavailable resource and it is determined whether the mode option is for the action requiring the unavailable resource. In response to the mode option being for the action requiring the unavailable resource, the action is automatically removed from the request. The request is passed for pipeline arbitration without the action requiring the unavailable resource.

An exemplary embodiment includes a method for dynamically altering a mode of a request signal for a cache. The request signal is received by the cache. The request signal includes a mode and a mode option, and the mode includes bits corresponding to actions. The cache determines whether resources are available for the bits to perform the actions. In response to at least one bit of the bits needing unavailable resources, the cache determines whether the mode option corresponding to the at least one bit is set. In response to the mode option being set for the at least one bit, the cache alters the at least one bit so that the at least one bit is turned off which designates performing no actions corresponding to the at least one bit. Altering the at least one bit changes the request signal to an altered request signal. The cache passes the altered request signal in place of the request signal to arbitration for a cache pipeline.

Another exemplary embodiment includes a cache. A request controller is configured to receive a request signal, where the request signal includes a mode and a mode option, and where the mode includes bits corresponding to actions. A filter is configured to determine whether resources are available for the bits of the mode. In response to at least one bit of the bits needing unavailable resources, the filter is configured to determine whether the mode option corresponding to the at least one bit is set. In response to the mode option being set for the at least one bit, the filter is configured to alter the at least one bit so that the at least one bit is turned off which designates performing no actions corresponding to the at least one bit. Altering the at least one bit changes the request signal to an altered request signal. An arbiter is configured to decide access to a pipeline, and the filter is configured to pass the altered request signal in place of the request signal to the arbiter.

Additional features and details are realized through the techniques of the present invention. Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

A pipelined controller capable of performing multiple types of operations requires that other controllers, needing to perform these actions, request access to the pipeline and specify the nature of the operation that is required. One approach is to specify a pipeline operation mode, indicating what pipeline resources and actions are required. When selecting which requestor (such as a central processing unit core, I/O controllers, cache controllers, dynamic random access memory (DRAM) controllers, etc.) should be input into the pipelined controller next, it is common to filter out requestors that require pipe resources and/or actions that are unavailable at that moment. Requestors that need more pipe controller resources have a harder time getting into the pipe compared to requestors that need fewer resources. Because of this difficulty in getting into the pipelined controller, requestors which need multiple pipe resources and/or actions may perform multiple requests to the pipeline controller, by requesting a single resource and/or action at a time in a conventional system. However, there are certain cases where multiple resources and/or actions need to be performed in a single pass through the pipelined controller.

Figure 1:
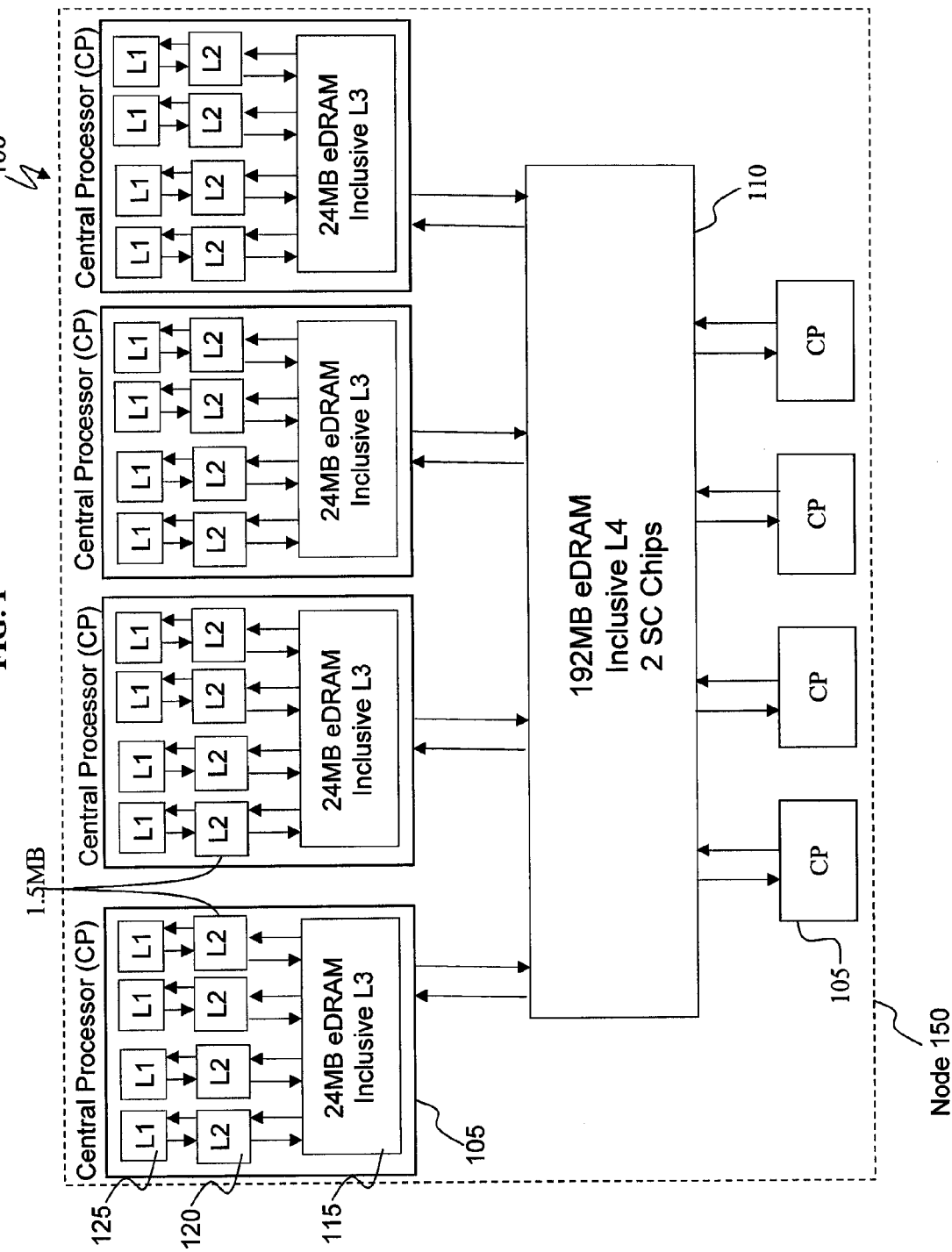
FIG. 1 depicts a state of the art cache topology.

FIG. 1 illustrates a state of the art cache topology 100. FIG. 1 illustrates a plurality of central processors (CP) 105 (also referred to as central processing units) operatively connected via busses to one or more L4 caches 110. Although not shown in FIG. 1, each of the central processors (CP) 105 includes one or more cores 130 (illustrated in FIG. 2) which perform the reading and executing of instructions. On each central processor (CP) 105, the multiple cores 130 are operatively connected via busses to the L1, L2, and L3 caches 125, 120, and 115 as understood by one skilled in the art. The L1 caches 125 are physically closest to the cores 130, next are the L2 caches 120, and then the L3 caches 115. It is understood that the designation of caches could be reversed. Although the L3 and L4 caches 115 and 110 may comprise embedded dynamic random access memory (DRAM) which is referred to as eDRAM, it is understood by a skilled artisan that any other types of suitable memory such as DRAM may be utilized. A plurality of central processors 105 operatively connected to the L4 caches 110 (e.g., two L4 caches) form a node 150. In a computing system, multiple such nodes 150 may be operatively connected to one another for communications such as making and responding to requests, as understood by one skilled in the art.

Each individual central processor 105 is fabricated on its own separate chip, which includes the L1, L2, and L3 caches 125, 120, and 115, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

Figure 2:
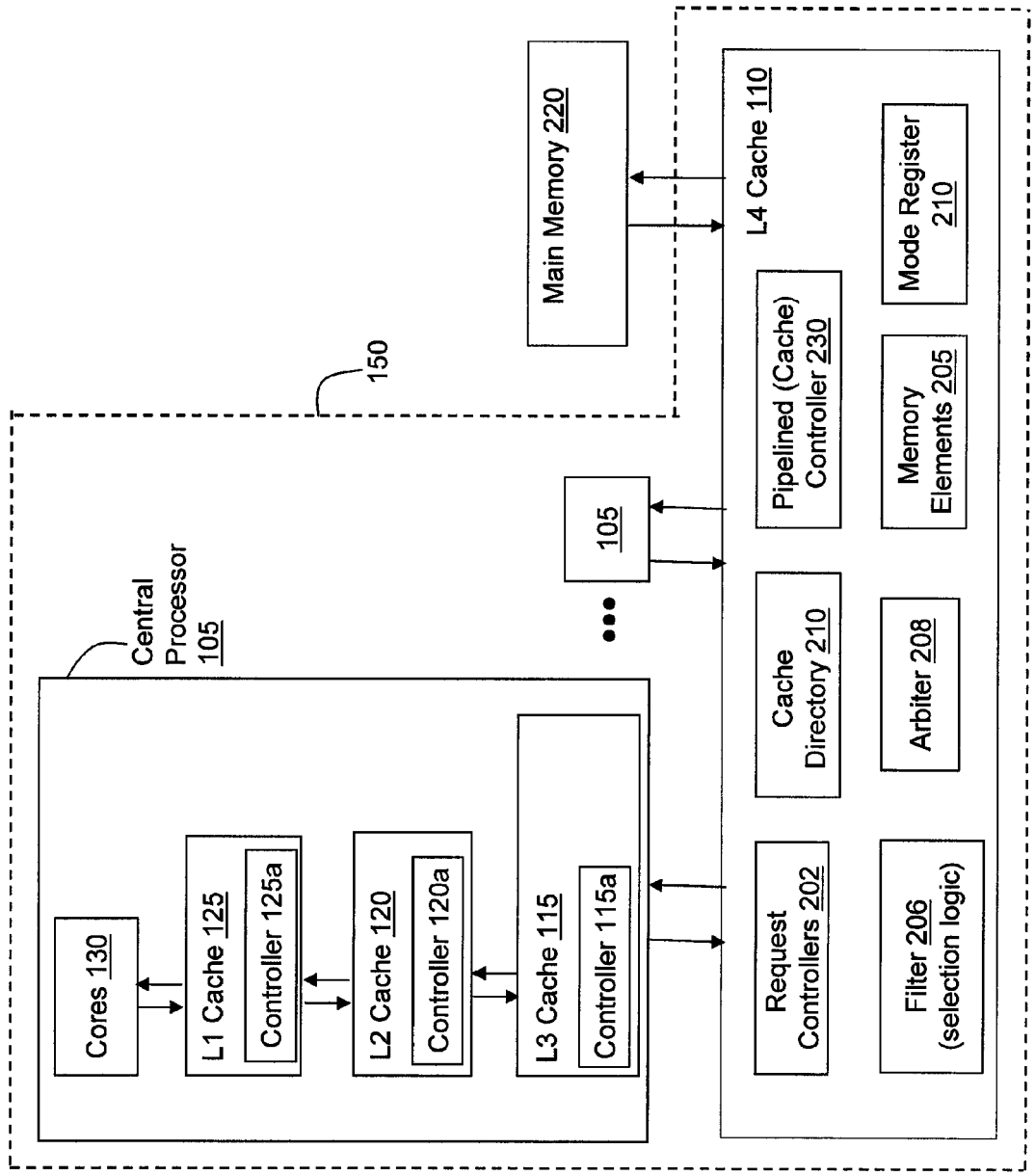
FIG. 2 depicts further details in accordance with exemplary embodiments.

FIG. 2 illustrates further details of the central processor 105 and the L4 cache 110 according to exemplary embodiments. For ease of explanation, FIG. 2 shows the details of a single central processor 105 operatively connected to a single L4 cache 110 but applies for multiple central processors 105 and multiple L4 caches 110. In FIG. 2, each of the L1 caches 125, L2 caches 120, and L3 caches 115 includes its own respective cache controller 125a, 120b, and 115b for controlling various operations such as sending, receiving, and executing requests (also referred to as request signals).

In accordance with exemplary embodiments, a requestor(s) indicates all of the desired resources and/or actions that it wishes to be performed, even if the requestor does not necessarily require that all actions be performed in one pass through the pipelined cache controller 230. The requestors may be L3 caches 115, the L2 caches 120, the L1 caches 125, the cores 130, and other nodes 150. The requestors may be on the same and/or different central processors 105. Requestors may be on the same and/or different nodes 150. Also, the requestor may be any I/O controller (not shown), as understood by one skilled in the art. Each requestor is able to individually request to the request controllers 202 the desired actions and/or resources that the requestors wish for the L4 cache 110 to perform. For the L4 cache, the resources may refer to accessing the cache directory 310, accessing memory elements 205 of the L4 cache 110, accessing main memory 220, and/or accessing other nodes 120. Note that other examples of resources include controllers that handle L4 cache misses, controllers that handle non-cacheable operations, and controllers that access the interface with the L3 caches. Also note that although exemplary implementations depict examples with respect to the L4 cache 110, it is understood that exemplary embodiments are not meant to be limited to operations of the L4 cache 110. For example, the technique disused herein applies equally to the L3 cache 115 receiving requests from, e.g., the L2 cache 120 and the L4 cache 110, and the L3 cache 115 may include the elements shown and described for the L4 cache 110. Also, exemplary embodiments may be implemented in, e.g., main memory 220, external memory (not shown), and any other hardware component, and the main memory 220, external memory, and hardware component would include the elements shown and described herein for the L4 cache 110.

Now returning to FIG. 2, assume that a plurality of different requestors (such as cores 130, L3 caches 115, L2 caches 120, L1 caches 125, and/or other nodes 120) make requests to the request controllers 202 of the L4 cache 110, and each request controller 202 receives, e.g., an 8 bit vector, as a request signal from the requestors. Each bit of the 8 bit vector corresponds to an action and/or a series of actions for the L4 cache 110 to perform, and the 8 bit vector may be referred as the mode, request mode, pipeline mode, and/or mode (0:x). The 8 bit vectors are stored in (read into) respective mode registers 210 of the L4 cache. Note that although an 8 bit vector may be discussed for explanation purposes, other size vectors (e.g., smaller and larger) may also be utilized and exemplary embodiments are not meant to be limited to any one size vector.

According to exemplary embodiments, the requestors such as the cores 130 and L3, L2, and L1 caches (via their respective controllers 115a, 120a, and 125a) are each configured to transmit additional signals along with their request signal to the request controllers 202. So in addition to the request controllers 202 receiving the 8 bit vector which is the mode, the request controllers 202 are configured to receive and process the additional signal via filters 206. The additional signal may be an additional 8 vector (which indicates the flexibility for each 8 bit vector of the mode) that allows the filter 206 to determine if the filter 206 can dynamically modify (i.e., whether it has permission to modify) the 8 bit vector (mode) received from the requestor. The additional 8 bit vector is configured to correspond one-to-one to bits of the 8 bit vector of the mode, and when a (flexible) bit of the additional 8 bit vector is turned on, the filter 206 is configured to read this flexible bit as a designation that the corresponding bit of the 8 bit vector of the mode is flexible. The filter 206 comprises input selection logic, e.g., such as logic gates, configured to perform logic operations to determine if modification is permitted and/or needed as discussed herein.

For example, using the additional set of signals in accordance with exemplary embodiments, the requestor is able to indicate (to the filter 206 of the L4 cache 110) which actions and/or resources the requestor can allow to be deferred to a subsequent (and/or multiple subsequent) pipe controller request. The input selection logic of the filter 206 is then able to check the availability of the requested actions and/or resources. If one or more requested actions and/or resources is not available and if the requestor has indicated in the additional signal that all of these unavailable actions and/or resources can be deferred to a subsequent pipeline request, the selection logic of the filter 206 is configured to allow that request from the requestor to enter the pipelined controller 230 by altering the mode. To signal that some requested actions and/or resources were unavailable in the mode, the selection logic of the filter 206 dynamically alters the requestor's pipe mode to indicate which actions were actually performed and which (originally requested) actions are not performed. The request controller 202 compares the altered mode that entered into the pipelined controller with the original mode it requested to determine which actions request controller 202 must still complete. In other words, any actions that were unable to be performed and removed in the altered mode (by the filter 206), can be determined and attempted again by the request controller 202. The request controller 202 and/or the requestor can send a new request in a mode requesting the particular actions that were not performed earlier.

With this method, requestors indicating a need for multiple actions and/or resources do not need to serialize their requests. Instead, the requestors can request everything that they want to do, and if all the action/resources are available, the actions and/or resources will be performed in one pass through the pipeline (cache) controller 230. If some actions needing particular resources are unavailable, those actions for resources that are available are allowed to proceed by the filter 206, while the actions for unavailable resources are removed from mode by the filter 206 and thus not performed. On average, requestors will be able to complete their pipelined controller activity with fewer pipeline requests compared to forcing the requestors to serialize their requests. In addition, requestors will be able to complete their required pipelined controller activities in a shorter amount of time (i.e. fewer processor cycles) because they will not have to wait extended periods of time for all required resources to become available in the same cycle. Furthermore, certain information gained by the successful execution of a requestor's initial pipe pass (i.e. lookup cache directory results) can enable the requestors to determine if certain resources that were speculatively included in the mode filter are actually needed at all. Thus, in many cases, a subsequent pipe request can occur right away because the availability of these certain resources are no longer relevant to the operation sequence.

Figure 3:
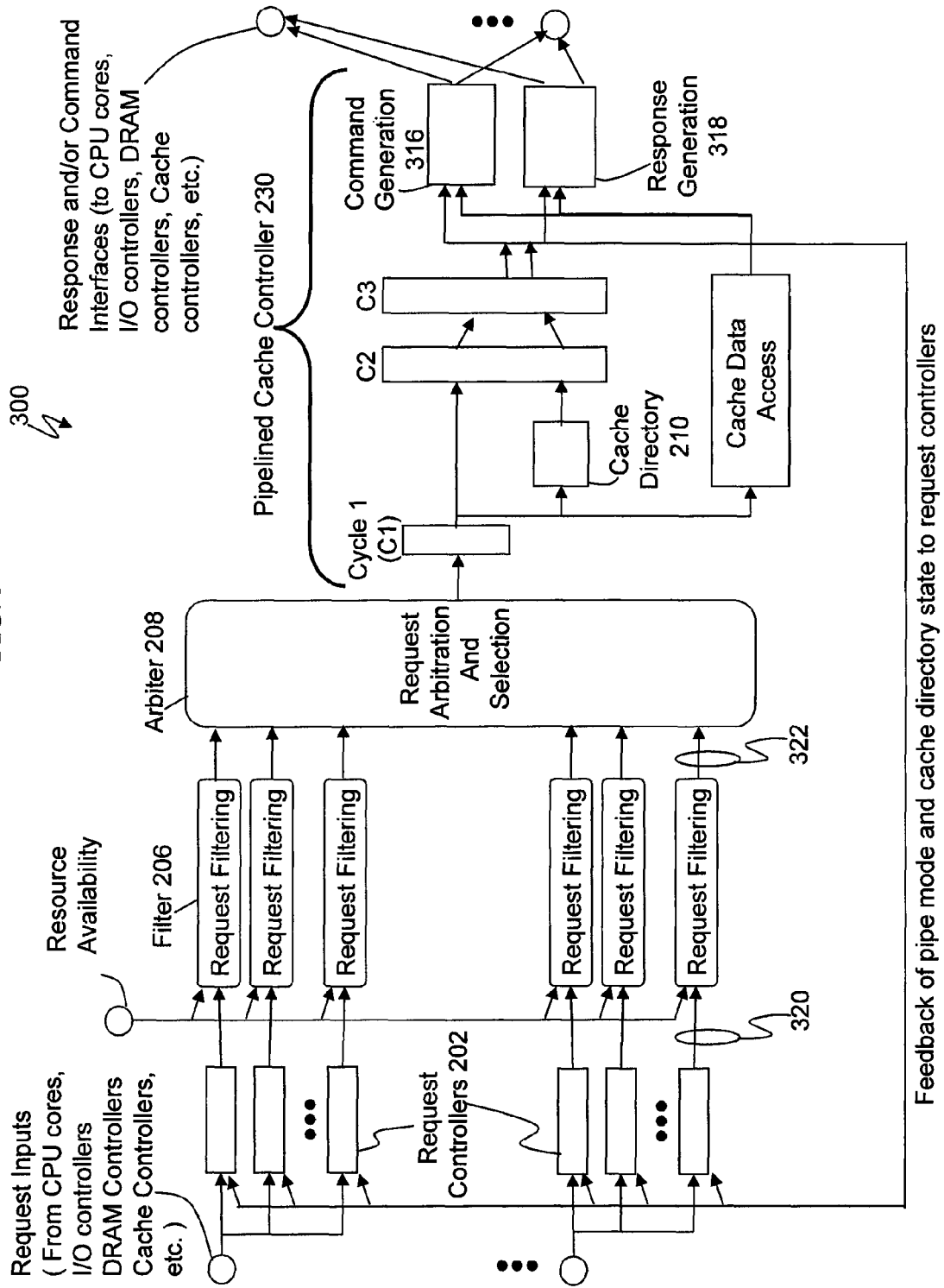
FIG. 3 depicts an example flow for dynamically modifying a pipe mode in accordance with exemplary embodiments.

Now turning to FIG. 3, FIG. 3 illustrates an example flow 300 for dynamically modifying the pipe mode in accordance with exemplary embodiments. The flow 300 illustrates the L4 cache 110 for explanation purposes, but the flow 300 applies to the L3 caches 115 and/or any other hardware component receiving requests for utilizing a pipeline and performing corresponding actions, which would be understood to one skilled in the art in light of the present disclosure.

There are requests coming into the L4 cache 110 from various requestors. In accordance with exemplary embodiments, the request includes the request signal along with the additional signal, and these two signals may be sent at once, sent as a combined signal, and/or sent substantially at the same time from the requestor to the L4 cache 110. The request signal and additional signal were previously described as two separate signals but it is not necessary that they be two separate signals.

There may be multiple request controllers 202, and each request controller 202 receives and loads a request from a requestor. The different requestors may be any hardware/software component making a request to the L4 cache 110.

Each request signal 320 (which refers to both the request signal and additional signal) received at one of the request controllers 202 is transmitted by the request controller 202 to one of the filters 206 to request filtering. At this point in the flow 300, the request signal 320 comprises: request valid; mode (0:x) (i.e., the 8 bit vector of the mode) which are all the actions that the requestor wants performed when all resources are available; mode_option(0:x) (i.e., the additional 8 bit vector) which indicates the actions that are optional/flexible; addresses of the requested resources indicates where the request wants to store and read data to; commands, etc.

Note that although the details are explained for a particular filter 206, this filter process occurs in each filter 206. The filter 206 is configured to receive the request signal 320 including the mode_option (0:x) which is the optional vector previously referred to as the additional signal. The filter 206 also receives and/or requests resource availability information for the resources identified in (the mode of) the request signal 320. For example, the selection logic of the filter 206 looks at the request signal 320 to determine what resources this particular requestor needs, looks at what resources are available, and looks at the mode optional setting (i.e., mode_option (0:x) vector). If all the requested resources needed for (all) actions are available, the filter 206 is configured to remove the mode_option (0:x) vector and send the request signal 320 to the arbiter 208. If the request signal 320 were received without the mode_option (0:x) vector, the filter 206 is configured to check the resource availability for the requested resources. Accordingly, the filter 206 is configured to reject the entire request (as an invalid request) if any one of the resources requested is not available and allow the request if all resources requested are available.

If there are some resources available (which includes actions that do not require accessing resources) and there are some resources not available, and if the mode_option (0:x) vector indicates that the not available resources are optional, the selection logic of the filter 206 is configured to determine this information from the request signal 320. As such, the filter 206 is configured to allow the actions for available resources (as well as allow actions which do not require any resources), while removing actions for not available resources. For each action of the not available resources designated as optional/flexible in the mode_option (0:x), the filter 206 is configured to dynamically alter the mode (0:x) vector to remove these actions (which could be one or more actions) corresponding to the not available resources. Moreover, the filter 206 is configured to alter bits of the 8 bit vector so that the 8 bit vector (i.e., mode_option (0:x)) is modified as though the 8 bit vector never included bits requesting those actions corresponding to the not available resources. For example, the filter 206 is configured to turn off (e.g., set to "0") those bits of the 8 bit vector (i.e., mode) which correspond to the not available resources, although those bits were originally set by the requestor.

Turning back to FIG. 3, the arbiter 208 receives a request signal 322 from the filter 206 to request arbitration and selection for the pipelined cache controller 230. The request signal 322 may be a modified request signal if the mode_option (0:x) was selected for actions not having available resources. However, even if the filter 206 modified the request signal 320 to be the request signal 322, the request signal 322 is now a normal request signal in the view of the arbiter 208 and is ready for processing by the arbiter 308. As mentioned above, the filter 206 removes the mode_option (0:x) vector and modifies the mode if necessary to only request actions for available resources, so that the request signal 322 includes request valid, mode (0:x), addresses of the requested resources, commands, etc. As such the request signal 322 appears just like any other request signal. As understood by one skilled in the art, the arbiter 208 is configured to select the (decide which) request signal 322 to pass on the pipeline of the pipelined cache controller 230.

At cycle (stage) C1 of the processor (e.g., the central processor 105), the pipelined cache controller 230 accesses the cache directory 210 to obtain the location of what is available in the memory elements 205 and performs a cache data access of the memory elements 205 of the L4 cache 110.

At cycle C2, a new request enters the pipelined cache controller 230.

At cycle C3, another new request enters the pipelined cache controller 230. At this stage, the cache memory elements 210 have been accessed, information is obtained from the cache directory 210, and the request 322 information flows through the pipelined cache controller 230. The request controller 202 that passed the request knows that the cycle time has ended for its particular request and is configured to monitor the output of the pipelined cache controller 230 to obtain the request signal 322 for its request. The request controller 202 compares the 8 bit vector (mode (0:x)) of the request signal 322 to the 8 bit vector (mode (0:x)) of the original request signal 320 to determine if the mode has be altered. In this case, the request controller 202 determines that the mode (mode (0:x)) has in fact been altered by the filter 206, and the request controller 202 (and/or requestor) is configured to resend any actions of the 8 bit vector mode that were not allowed (i.e., turned off by the filter 206) to pass to the arbiter 208 and which are determined to be still required based on the results obtained from the initial pipe pass. If there is more than one action requiring different resources, the request controller 202 may be configured to turn on the mode_option (0:x) for each bit corresponding to those actions. However, if there is only one action remaining for one resource and/or if remaining actions all (only) require the same resource, the request controller 202 (and/or requestor) is configured to not turn on the mode (0:x), e.g., the particular flexible bit(s) corresponding to the that remaining action(s).

Further, in FIG. 3, the pipelined cache controller 230 is configured to generate appropriate commands and responses as understood by one skilled in the art. For example, if the action(s) were performed (e.g., a hit to the cache), the pipelined cache controller 230 is configured to generate a response 318 back to the requestor indicating that the actions are complete. If another chip (such as the central processor 105, another node 120, etc.) is modifying the data, the pipelined cache controller 230 is configured to generate a command 316 to ask that chip for the latest copy of the data. If there was a cache miss, the pipelined cache controller 230 may have to generate and send a command 316 requesting the data from another cache (which would be on the same or another chip or on the same or another node), or the pipelined cache controller 230 may have to send a command requesting the data from the main memory 220.

Figure 4:
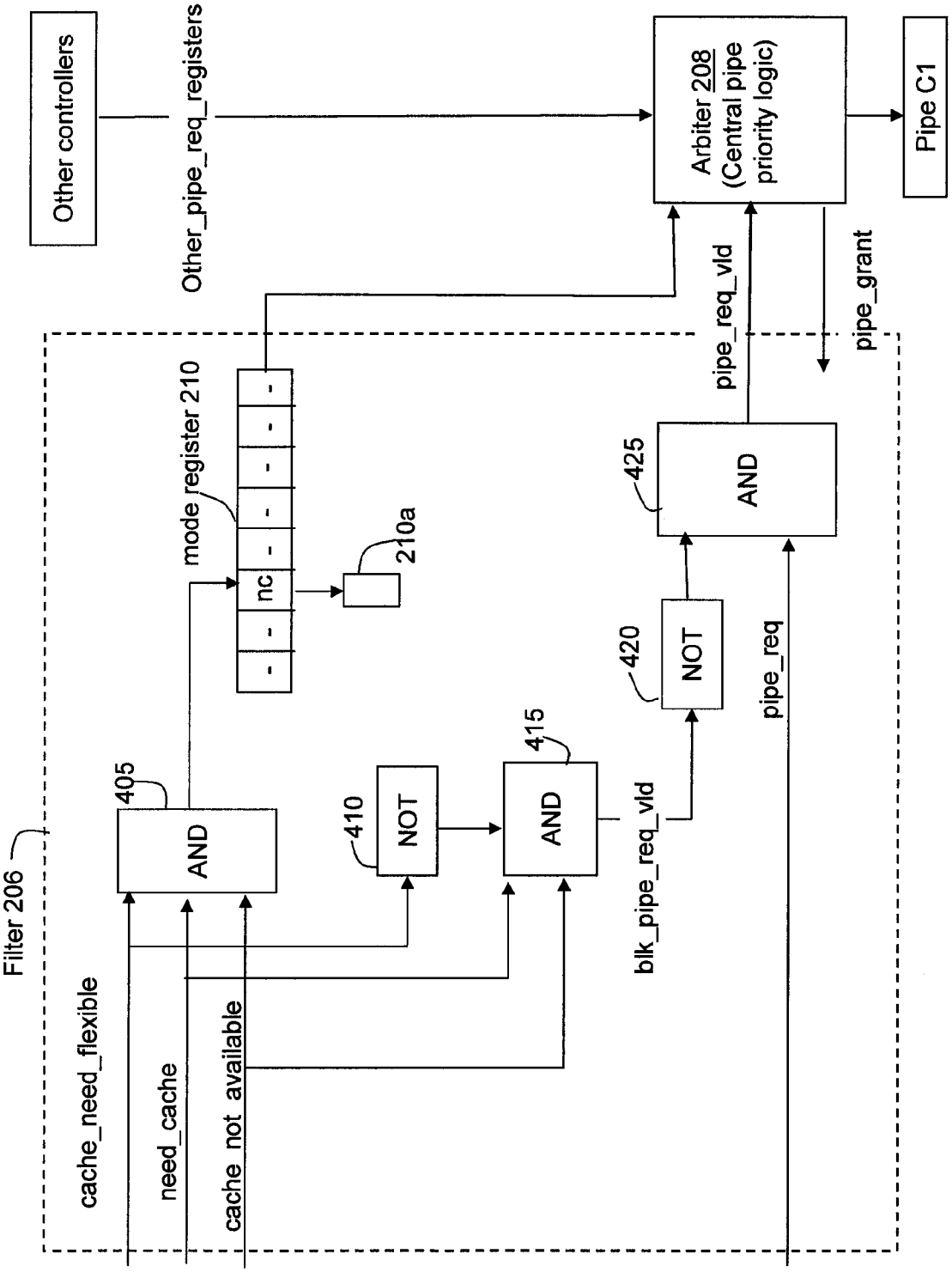
FIG. 4 depicts an example of dynamic mode altering by a filter in accordance with exemplary embodiments.

Now turning to FIG. 4, FIG. 4 illustrates an example of dynamic mode altering by the filter 206 in accordance with exemplary embodiments. Although the filter 206 is configured to alter the mode, the functionality of the filter 206 may be integrated in another component such as the request controllers 202 and/or the arbiter 208.

FIG. 4 depicts one implementation of the selection logic of the filter 206 for explanation purposes and not limitation, and the selection logic may be implemented in various ways as desired to achieve the functionality of the filter 206 according to exemplary embodiments.

An example case will be described and provided but it is understood that exemplary embodiments are not meant to be limited. As discussed in FIG. 3, the filter 206 is configured to receive and analyze the request signal 320 which comprises: request valid; mode (0:x) which are all the actions that the requestor wants performed assuming that all resources are available; mode_option(0:x) which indicates the actions that are optional when corresponding resources are not available; addresses of the requested resources; commands, etc.

In FIG. 4, an "AND" logic gate 405 of the filter 206 receives input of cache_need_flexible. This means that mode_option (0:x) is set for at least one or more bits of the 8 bit vector (mode) indicating that the particular action(s) for this bit(s) is optional if its corresponding resource is not available. The logic gate 405 receives input of need_cache which indicates that the memory elements 205 of the L4 cache 110 are needed for mode (0:x). With respect to resource availability discussed for FIG. 3, the logic gate 405 receives input cache_not_available which indicates that the memory elements 205 of the L4 cache are not available. Particularly, cache_not_available indicates that cache interleave is not available, and the cache interleave is a certain portion of memory elements 205 desired by the request signal 320. Note that the cache could have been available and the request signal 320 would proceed without altering the mode, and the mode_opt (0:x) would be removed from the request signal 320. Since the particular bit of the 8 bit vector (i.e., mode) needs the cache and the L4 cache 110 is not available, the filter 206 would have normally rejected this request, but since the mode_opt (0:x) is selected for this particular bit, the filter 206 modifies this particular bit (which could be multiple bits of the mode register 210 in some cases). In this example case, the filter 206 dynamically alters the particular bit 3 (which is the $3^{rd}$ bit) of the 8 bit vector in the mode register 210. The filter 206 turns off the particular bit 3 corresponding to the action indicating need cache "nc" so that the action needing the cache will not be executed. Box 210a illustrates that the particular bit 3 is now blank because bit 3 shown as box 210a has been modified (turned off) by the filter 206. Accordingly, the 8 bit vector now having a modified bit 3 shown as box 210a is passed to the arbiter 208 by the filter 206.

Continuing the example, the cache_need_flexible (i.e., mode_opt (0:x)) is selected, and the mode option flexible for the particular bit 3 is input into a "NOT" logic gate 410 which outputs (the opposite) the mode option for the particular bit 3 is not flexible into an "AND" logic gate 415. However, the request signal 320 still needs the cache (need_cache) but the L4 cache 110 is not available (cache_not_available). All of this information is also input into the "AND" logic gate 415. The logic gate 415 outputs blk_pipe_req_vld which indicates to block the pipe request 320, and this is input into a "NOT" logic gate 420 which outputs (the opposite) pipe request valid into an "AND" logic gate 425. The logic gate 425 also receives the raw request signal 320 (pipe_request). The gate logic 425 outputs pipe_req_vld (pipe request valid) to the arbiter 208 for this pipe request signal 320 because the filter 206 has modified the particular bit 3 of the 8 bit vector. If the mode_opt (0:x) allowing alteration of the particular bit 3 of the mode register 210 were not selected, the logic gate 425 would have blocked output pipe_req_vld for the request signal 320 because the L4 cache 110 is not available.

Elements discussed herein can be implemented with many technologies including but not limited to any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although, e.g., the filter 206 may be implemented with various types of circuits and hardware components (such as caches and cache controllers), the selection logic of the filter 206 is not meant to be limited. The (selection logic of) filter 206 may also include and/or be implemented as firmware, opcode, minicode, etc., in accordance with exemplary embodiments and as understood by one skilled in the art.

Figure 5:
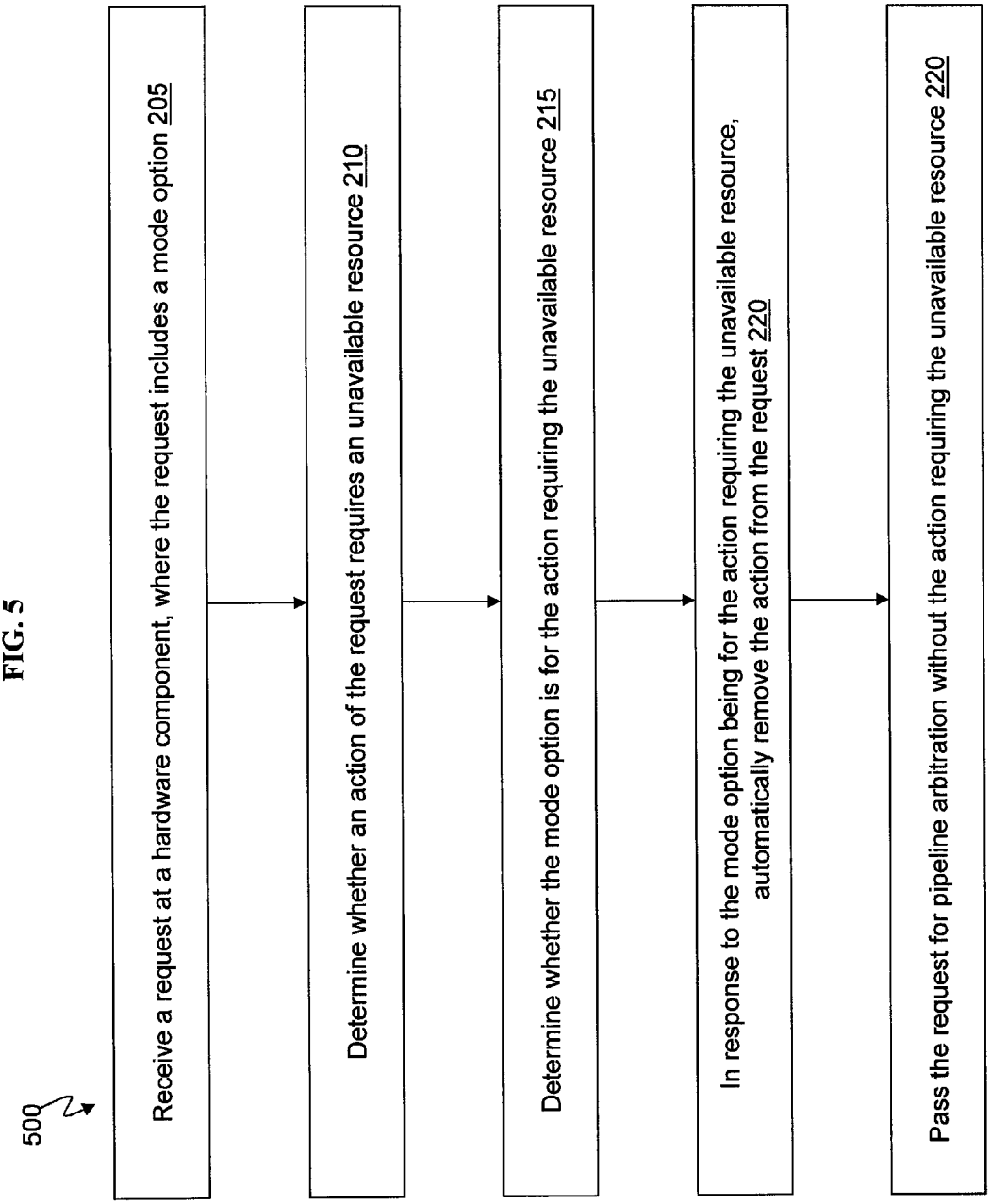
FIG. 5 depicts a method in accordance with exemplary embodiments.

FIG. 5 illustrates a method 500 for dynamically altering a request received at a hardware component (such as a cache, main memory, external storage, etc.) in accordance with exemplary embodiments. Although examples utilizing caches (such as the L4 cache) have been discussed for explanation purposes, exemplary embodiments are not meant to be limited and apply to any hardware component, e.g., receiving requests/request signals for access to a pipeline.

At 505, the hardware component (e.g., the L4 cache 110) receives the request such as the request signal 320, and the request includes a mode option along with the mode (which is the 8 bit vector where each bit corresponds to one or more actions).

At 510, the hardware component (e.g., the filter 206 of the L4 cache 110) determines whether an action of the request requires an unavailable resource.

At 515, the filter 206 determines whether the mode option is for the action requiring the unavailable resource, e.g., for the particular bit (of the 8 bit vector mode) indicating an action that needs unavailable resources.

At 520, in response to the mode option being for the action requiring the unavailable resource, the filter 206 is configured to automatically remove the action from the request by altering the particular bit of the 8 bit vector of the mode. For example, the filter 206 is configured to turn off the particular bit of the 8 bit vector which needs the unavailable resource. If multiple bits of the 8 bit vector need unavailable resources, the filter 206 is configured to turn off each of the multiple bits needing unavailable resources (when the multiple bits have been designated as flexible in the mode option), while leaving the other bits not needing unavailable resources unchanged.

At 525, the filter 206 is configured to pass the request to the arbiter 208 for pipeline arbitration without the action(s) requiring the unavailable resource.

Further, the filter 206 is configured to remove the mode option from the request before passing the request to the arbiter 208 for the pipeline arbitration. In response to the mode option not being for the action requiring the unavailable resources, the filter 206 is configured to block the request (e.g., the request signal) from being passed for the pipeline arbitration. The filter 206 of the L4 cache is configured to receive the request having a plurality of actions in which some actions require available resources and some actions require unavailable resources; if the mode option of the request corresponds to the some actions requiring the unavailable resources, the filter 206 is configured to automatically remove the some actions requiring the unavailable resources from the request and pass the request to the arbiter 208 with the some actions requiring the available resources for the pipeline arbitration. The request is received at the hardware component (e.g., the request controllers 202 of the L4 cache 110) from a requestor (which is at least one of a different cache, a processor core, a central processor, and a controller on another chip).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for dynamically altering a request received at a hardware component, comprising:
   receiving the request at the hardware component, wherein the request includes a mode option;
   determining whether an action of the request requires an unavailable resource;
   determining whether the mode option is for the action requiring the unavailable resource;
   transmitting an additional signal indicating that the unavailable resource is deferrable to a subsequent pipe controller request;
   based on the mode option being for the action requiring the unavailable resource and on the unavailable resource being deferrable to the subsequent pipe controller request, automatically removing the action from the request;
   passing the request for pipeline arbitration without the action requiring the unavailable resource based on the mode option indicating the unavailable resource is optional; and
   passing the request for pipeline arbitration with at least one action requiring available resources.

2. The method of claim 1, further comprising removing the mode option from the request before passing the request for the pipeline arbitration based on the mode option indicating that the unavailable resource is optional.

3. The method of claim 1, further comprising based on the mode option not being for the action requiring the unavailable resources, blocking the request from being passed for the pipeline arbitration.

4. The method of claim 1, further comprising receiving the request having a plurality of actions in which the at least one action requires available resources and other actions require unavailable resources;
   based on the mode option of the request being set for the other actions requiring the unavailable resources:
      automatically removing the other actions requiring the unavailable resources from the request.

5. The method of claim 1, wherein the request is received at the hardware component from a requestor.

6. The method of claim 5, wherein the hardware component is a cache on a chip and the requestor is a different hardware component.

7. The method of claim 6, wherein the requestor is at least one of a different cache, a processor core, a central processor, and a controller on another chip.

8. The method of claim 1, wherein the request before removing the action requiring the unavailable resource is an original request; and
   wherein the request after removing the action requiring the unavailable resource is an altered request;
   further comprising sending feedback of the altered request.

9. The method of claim 8, further comprising comparing the original request to the altered request to determine the action that was removed because of the unavailable resource.

10. The method of claim 9, further comprising receiving a new request comprising the action that was removed because of the mode option at the hardware component;
    wherein the new request is configured not to comprise any previous actions of the request that were for the available resources and that were not removed because of the mode option.

11. The method of claim 10, wherein based on the action that was removed being the only action for the new request, not receiving a new mode option corresponding to the action that was removed.

12. The method of claim 10, wherein the new request comprises the action that was removed, along with any other actions that were removed from the request because of the mode option.

13. A method for dynamically altering a mode of a request signal for a cache, comprising:
  receiving the request signal by the cache, wherein the request signal comprises a mode and a mode option, and wherein the mode comprises bits corresponding to actions;
  determining by the cache whether resources are available for the bits to perform the actions;
  based on at least one bit of the bits needing unavailable resources, determining by the cache whether the mode option corresponding to the at least one bit is set;
  transmitting an additional signal by the cache, the additional signal indicating that the unavailable resources are deferrable to a subsequent pipe controller request;
  based on the mode option being set for the at least one bit and the unavailable resources being deferrable to the subsequent pipe controller request, altering by the cache the at least one bit so that the at least one bit is turned off which designates performing no actions corresponding to the at least one bit, wherein altering the at least one bit changes the request signal to an altered request signal, and the mode option corresponding to the at least one bit indicates at least one action associated with the at least one bit is optional; and
  passing by the cache the altered request signal in place of the request signal to arbitration for a cache pipeline, the altered request signal passing at least one action requiring available resources.

14. The method of claim 13, removing the mode option from the altered request signal before passing the altered request signal to arbitration for the cache pipeline based on the mode option indicating that the unavailable resource is optional.

15. The method of claim 13, further comprising based on determining by the cache that the mode option corresponding to the at least one bit needing unavailable resources is not set:
  not altering the request signal to change to the altered request signal; and
  blocking the request signal from being passed to arbitration for the cache pipeline.

16. The method of claim 13, further comprising sending feedback of the altered request signal; and
  comparing the request signal to the altered request signal to determine the at least one bit that was altered because of the unavailable resources for the corresponding actions of the at least one bit.

17. The method of claim 16, further comprising receiving a new request signal comprising the at least one bit for the corresponding actions.

18. A cache, comprising:
  a request controller configured to receive a request signal, wherein the request signal comprises a mode and a mode option, and wherein the mode comprises bits corresponding to actions;
  a filter configured to determine whether resources are available for the bits of the mode, wherein based on at least one bit of the bits needing unavailable resources, the filter is configured to determine whether the mode option corresponding to the at least one bit is set;
  wherein based on the mode option being set for the at least one bit, the filter is configured to alter the at least one bit so that the at least one bit is turned off which designates performing no actions corresponding to the at least one bit; and
  wherein the cache transmits an additional signal, the additional signal indicating that the unavailable resources are deferrable to a subsequent pipe controller request; and
  wherein altering the at least one bit changes the request signal to an altered request signal, and wherein altering the at least one bit is based on the unavailable resources being deferrable to the subsequent pipe controller request, and the mode option corresponding to the at least one bit indicates at least one action associated with the at least one bit is optional; and
  an arbiter configured to decide access to a pipeline;
  wherein the filter is configured to pass the altered request signal in place of the request signal to the arbiter, the altered request signal passing at least one action requiring available resources.

19. The cache of claim 18, wherein the resources comprise at least one of cache memory elements and a cache directory.

20. The cache of claim 18, wherein the request controller is configured to receive the request signal from a requestor.

21. The cache of claim 18, wherein after the altered request signal passes through the pipeline, the altered request signal feeds back to the request controller; and
  wherein the request controller is configured to compare the altered request signal to the request signal to determine the at least one bit that was altered by the filter.

22. The cache of claim 21, wherein the request controller is configured to pass a new request signal including the at least one bit to the filter but not including any bits that were not altered by the filter.

* * * * *